United States Patent [19]
Suzuki et al.

[11] 3,920,875
[45] Nov. 18, 1975

[54] COATED POLYMERIC PAPER FILMS AND A METHOD OF PRODUCING THE SAME

[75] Inventors: Tosho Suzuki; Koichi Awano; Ogino Katsuhisa, all of Tokyo, Japan

[73] Assignee: Nissan Boseki Kabushiki, Kaisha, Japan

[22] Filed: May 30, 1972

[21] Appl. No.: 257,555

Related U.S. Application Data

[63] Continuation of Ser. No. 45,935, June 12, 1970, abandoned.

[30] Foreign Application Priority Data

July 11, 1969 Japan.............................. 44-54555
June 8, 1970 Japan.............................. 45-48691
Mar. 2, 1970 Japan.............................. 45-17076

[52] U.S. Cl. ................ 427/245; 427/307; 427/336
[51] Int. Cl. ........................ B41m 5/14; D21h 5/00
[58] Field of Search .... 117/161 UZ, 161 UF, 119.8, 117/161 UH, 63, 11, 36.7, 47 A, 64, 47 A, 12

[56] References Cited
UNITED STATES PATENTS

| | | | |
|---|---|---|---|
| 2,209,940 | 7/1940 | Smith | 117/47 A |
| 2,662,033 | 12/1953 | Andrew | 117/47 A |
| 2,790,727 | 4/1957 | Hilborn | 117/63 |
| 2,848,752 | 8/1958 | Bechtold | 117/36.7 |
| 2,993,805 | 7/1961 | Kay | 117/36.7 |
| 3,051,992 | 9/1962 | Bradley | 117/119.8 |
| 3,054,691 | 9/1962 | Myer et al. | 117/161 UF |
| 3,068,118 | 12/1962 | Biskup et al. | 117/161 UF |
| 3,078,178 | 2/1963 | Ostberg | 117/64 |
| 3,100,721 | 8/1963 | Holden | 117/161 UF |
| 3,108,872 | 10/1963 | McMahon | 117/36.7 |
| 3,135,622 | 4/1964 | Ranalli | 117/63 |
| 3,137,666 | 6/1964 | Lox et al. | 117/161 UF |
| 3,154,605 | 10/1964 | Meyer et al. | 117/119.8 |
| 3,208,875 | 9/1965 | Holden | 117/63 |
| 3,236,717 | 2/1966 | Adhikary | 117/36.7 |
| 3,278,322 | 10/1966 | Harkins et al. | 117/161 UF |
| 3,298,895 | 1/1967 | Plambeck | 117/36.7 |
| 3,311,497 | 3/1967 | Park | 117/138.8 |
| 3,515,567 | 6/1970 | Tani et al. | 117/11 |
| 3,620,806 | 11/1971 | Kohne et al. | 117/36.7 |
| 3,730,667 | 5/1973 | Tani | 117/63 |

OTHER PUBLICATIONS

The Condensed Chemical Dictionary 7th Ed. Reinhold Corp. N.Y. 1966 p. 334.

Primary Examiner—William R. Trenor
Attorney, Agent, or Firm—Robert E. Burns

[57] ABSTRACT

This invention relates to coated paper-like plastic films having a microporous surface layer and a method of producing the same. Such a coated plastic film is produced by coating plastic polymeric films with a coating composition comprising a resin, a plasticizer, an inorganic fine powder and dimethylformamide and then the coated plastic film is treated with water and subjected to drying. Also, in accordance with this invention, the coated plastic film is subjected to a heat-treatment before or after the coated plastic film is treated with water or after the coated plastic polymeric film is dried.

14 Claims, No Drawings

COATED POLYMERIC PAPER FILMS AND A METHOD OF PRODUCING THE SAME

This is a continuation, of application Ser. No. 45,935, filed June 12, 1970, now abandoned.

This invention relates to coated plastic films. And more particularly, this invention relates to coated plastic films made of vinyl polymers, vinyl copolymers, polycarbonates, 8-nylon, or cellulosic plastics having their microporous surface layers. Such coated plastic films can be used in printing, drawing or graphic art. Also, this invention relates to a method for producing the coated plastic films by coating certain plastic films with a coating composition comprising a resin, a plasticizer, an inorganic fine powder and dimethylformamide and then successively or simultaneously treating the coated plastic films with water and heat.

There are known several methods of modifying a certain plastic film to make a paper-like product which can easily be processed by means of printing or drawing technique. One of these is related to roughening the surface of the plastic film by treating it with chemical and mechanical means or a solvent. However, the modified film prepared by such a method is inferior in its opacity and has only poor printing acceptability. The other method proposed is to coat the plastic film with a coating composition comprising a pigment and a binder or an adhesive. But, in this case, the drying of the coated film is very critical, and often requires a prolonged drying time and a large drying apparatus. This is caused by the tendency of blistering during drying at higher temperatures. Further, when an aqueous coating composition is applied, the surface layer of the resultant film is poor in its wet strength.

According to the present invention, unlike the above mentioned methods, it is possible to coat a plastic film with microporous surface layers having the superior printing and drawing qualities.

A coated plastic film can be prepared by coating on a plastic polymer film a composition comprising a solvent which dissolves or swells the plastic film, a resin which is the same polymer type as that of the plastic film and an inorganic fine powder which is dispersed in said solvent and then successively treating the coated polymer film with a liquid which is not a solvent for the plastic film but which is miscible with said solvent. However, the coated layer thus formed is very weak and liable to peeling. This defect would be fatal for the object of this invention, because the coated plastic film can not be printed without serious picking or peeling of the surface layer due to the tackiness of the printing ink. Thus the coated film would never be used in practice. It is possible to overcome such a defect by incorporating a thermosetting resin with the coating composition, but by this means, there appears to be a drawback of a prolonged drying time and a reduction of the wet-surface strength of the coated film.

It seems that the fragileness of the surface layer formed on the plastic film by the above described methods is not dependent on the defeciency of adhesion between the surface layer and the base film, but results from the insufficient cohesion between the fine particles of each of the resin and the inorganic substance which are deposited and form the microporous surface structure on the plastic film.

Now, according to a novel process of this invention, such a defect is completely removed and it is possible to provide a coated plastic polymer film having an impeccable surface layer for printing or drawing use comparable to cellulosic papers.

An object of this invention is to provide a coated plastic polymer film by forming a microporous surface layer containing an inorganic fine powder on a plastic polymer film that is suitable for the use of printing, drawing, graphic art and etc. The other object of this invention is to provide an industrial method for producing the coated plastic film having such utility.

The method of this invention consists substantially of the following steps. At the first step, plastic polymer film is coated with a coating composition which comprises mainly a resin or a mixture of resin selected from the plastic polymer resins which are the same polymer types as those used in producing the plastic film: a substance selected from materials or mixtures of such materials which are commonly used for plasticizing said resin (such materials are referred to as plasticizer hereinafter), an inorganic fine powder or its mixture, dimethylformamide as a solvent, and other ingredients if desired. At the second step, the plastic film coated with the above mentioned coating composition is successively treated with water to coagulate the coated layer and is then followed by a drying step. In addition to the above mentioned steps, the films is subjected to a heat treatment as an important step indispensable to this invention. This treatment may be conducted just after the first step or after the second step, or after the drying step.

In this invention, the coating composition attacks the plastic film by the dissolving or swelling action of dimethylformamide and then the coating composition coagulates rapidly on the surface of the film in the state of fine particles by treating with water. In this state, however, the surface of the coated film is still very fragile and therefore the coated film can not practically be used for the object of this invention. The object of this invention is ultimately attained by the action and effect of the heat treatment of the coated film. The effect of the heat treatment is considered to promote the cohesion of coagulated particles of the plasticized resin on the surface of the plastic film. Accordingly, the heat treatment must be so conducted that the plasticized resin on the coated layer can be sufficiently coalesced without softening or deforming of the plastic film.

The whiteness and opacity of the coated plastic film according to this invention results from the synergistic action and effect between the inorganic fine powder contained in the coating composition and the microporous surface structure resulting from the process of this invention. This is proved by the fact that the whiteness and opacity of the coated plastic film decreases when said coated plastic film is heat-treated for a prolonged time at a temperature just below of the softening or the deforming temperature of the plastic film. It is theorized that the surface layer of the film changes from the microporous structure into a fused and continuous skin-like structure. On the other hand, a plastic film which is coated with a coating composition not containing the inorganic fine powder is inferior in its opacity and whiteness and such a plastic film is easily changed into a translucent film when it is heat-treated for a short period of time. This proves the synergistic action and effect between the light-scattering ability of the microporous structure and the masking ability of the inorganic fine powders in accordance with this invention.

In accordance with this invention, any film which can be dissolved or swelled in dimethylformamide are used as a base film. Examples of such a film are; a film made of vinyl polymer, vinyl copolymer, polycarbonate, 8-nylon, or cellulose plastics. However, the preferred films are those made of vinyl polymers or vinyl copolymers, because the others are usually too expensive or inadequate in their properties for the purpose of this invention. More preferred vinyl polymers and vinyl copolymers are those in which styrene or vinyl chloride is contained as one of components for polymerization. Examples of these polymers are; polystyrene, stryene-butadiene copolymer, styrene-butadiene-acrylonitrile copolymer, styrene-acrylonitrile copolymer, polyvinyl chloride, vinyl chloride-vinylidene chloride copolymer, vinyl chloride-viny acetate copolymer. These films may be oriented in uniaxial or biaxial directions or may not be oriented, but the biaxially oriented films are preferably used because of their improved physical properties.

The polymer resin used in the coating composition in accordance with this invention should be soluble in dimethylformamide, and is selected from the types of the polymers of which the base films are made. To be precise, if the base film is made of resin containing styrene as one of components for polymerization, the resin contained in the coating composition should also be resin containing styrene as one of components for polymerization, and if the base film is made of a certain resin containing vinyl chloride as one of polymerization components, so the resin contained in the coating composition should contain vinyl chloride as a component. It should be noted that the resins contained in the coating composition need not always be made of the same components as those of the base film. Further, mixtures of two or more kinds of resins can be used in this invention.

The plasticizer which is used in this invention as one of components of the coating composition, is a compound which plasticizes the resin and depresses the glass transition temperature or the 2nd order transition temperature of the resin. Such a plasticizer should be compatible with the resin but insoluble or scarecely soluble in water so that it might be retained in the coated layer during the water treatment. Examples of such plasticizers are; phthalic acid esters comprising dimethyl phthalate, dioctyl phthalate, diethyl phthalate, butyl benzyl phthalate, dilauryl phthalate, butyl lauryl phthalate, diisodecyl phthalate, and like compounds, phosphoric acid esters comprising tributyl phosphate, tricresyl phosphate, triphenyl phosphate, trioctyl phosphate, trichloroethyl phosphate, and like compounds, dibasic acid esters comprising dibutyl adipate, dioctyl adipate, dioctyl azelate, dioctyl sebacate, dibenzyl sebacate, and like compounds, glycol esters and glycerides comprising triethylene glycol di(2-ethylhexoate), glycerine triacetate, and like compounds, aliphatic acid esters comprising butyl stearate, butyl oleate, and like compounds, polyesters comprising polyethylene adipate, polypropylene adipate, and like compounds, epoxy compounds such as epoxydized soybean oil or polyepoxy compound derived from bisphenol and epichlorohydrin, chlorinated paraffin, etc. Solid compounds at the ambient temperature, for example, camphor, naphthalene and the like compounds may also be used. All these plasticizers compounds may be used alone or in their admixtures.

The inorganic fine powder used in this invention must be sufficiently fine, having high light-scattering ability and good dispersing ability in dimethylformamide. Examples of these are calcium carbonate, magnesium carbonate, magnesium oxide, aluminum oxide, zinc oxide, titanium dioxide, zinc sulfide, calcium hydroxide, kaolin, clay, and the like. It is noted that the mixtures of these compounds may be used.

In accordance with this invention, the coating composition is prepared by using the wide ranges of proportions of the components. For every 100 parts of the resin (parts used herein and Examples are given by weight unless otherwise specified), there are used 1 to 100 parts of plasticizer, 10 to 1,000 parts of inorganic fine powder, and 20 to 2,000 parts of dimethylformamide. The action and effect of the plasticizer may vary depending on type, but in general, it has no effect in an amount less than 1 part, and it is excessively plasticized in an amount of above 100 parts accompanied with lowering of the opacity and the whiteness of the coated layer. For most applications, a preferable range of the amounts of the plasticizer is in between 5 and 50 parts.

The use of the inorganic fine powder in an amount of below 10 parts is insufficient for the opacity, and the bonding power of the resin becomes too low when the inorganic fine powder is used in an amount of above 1,000 parts. The most practical range of the amount of the inorganic fine powder falls in the range 30 to 500 parts.

Dimethylformamide, the solvent of the coating composition, is used in an amount varying from 20 to 2,000 parts. In an amount of below 20 parts of the solvent, the coating composition becomes too viscous to be used in the coating procedure. When the solvent is used in an amount of 20 to 200 parts, the inorganic fine powder is restricted to an amount less than 500 parts and also the moisture content of the inorganic fine powder is restricted below 10 parts. An amount of above 2,000 parts of dimethylformamide in the coating composition is also unfavorable, because the solid content of the composition becomes too low to coat in effective thickness. The most preferable range of the dimethylformamide is about 100 to 1000 parts.

In accordance with this invention, any coating procedures may be applied if they can produce an uniform coating. For example, roll-coating, air-knife coating, or curtain coating may be used. When the ratio of the resin to dimethylformamide contained in the coating composition is high, in particular, where less than 200 parts of dimethylformamide is used for 100 parts of the coating resin, composition is very susceptible to the moisture, and tends to form a skin on its surface, so one may often need to keep the whole coating unit in dry state.

After coating the plastic film, the coated film should be immediately treated with water in order to coagulate the coated surface. The intervals of the time elapsed from the coating step to the water treatment is particularly important. In case of the long interval, there is a danger of excess errosion and decrease in film strength caused by dimethylformamide. Accordingly, the coated film must be treated with water as quickly as possible, at least within 30 seconds.

As previously stated, heat treatment is an indispensable process of this invention, and is carried out at any of the stages after the coating step. The treatment is conducted by means of hot air, infrared heating, roll heating or high frequency induction heating, but it is preferable to use hot water or steam. By treating with hot water, it may be conducted at any desired stage after the coating step, and in particular, it can be treated just after the coating step. This can be done merely by treating the coated film with hot water, because the hot water coagulates or gels the coated surface, and also increasing the mechanical strength of the coated surface at the same time. By selecting the method other then the hot water treatment, the coated film must be contacted with water before it is subjected to the heat treatment. The heat treatment is conducted in such a manner as that the coated layer is softened but the base film is not suffered from any distortion or deformation. The condition for treatment depends on the types of the base films and the constitution of the coating composition. For example, when a biaxially oriented polystyrene film is coated with the composition consisting of 100 parts of polystyrene, 20 parts of dioctylphthalate, 200 parts of clay, 3 parts of calcium stearate, and 400 parts of dimethylformamide and followed by successive treatment with cold water and hot water, the temperature of hot water is between 75° to 100°C, and the time required for passing through the hot water bath is about 1 to 20 seconds depending on that temperature. In this example, at a temperature lower then 75°C, the surface strength of the resulted coated film is quite inadequate, and at a higher temperature over 100°C, the base film tends to contract during the treatment.

The drying step of the coated film after the treatment with water or with hot water is not critical and the drying condition has no substantial problems. The effect of the drying step in this invention, is merely to remove the water accompanied with coagulated surface layer, so the drying is easy and rapid by conventional drying methods. In particular cases, it is possible to omit the drying step. Advantages due to the use of hot water or steam as the heat treatment are that it is easy to control the treating condition and the heat transfer is rapid in the wet state. When another method of heat treatment is used, control of the treating condition is somewhat difficult and such a heat treatment requires a long time.

The coated plastic films prepared in accordance with this invention have superior qualities for the use in printing, drawing, graphic art, etc., as compared to cellulosic papers. And further, unlike the cellulosic papers, the coated plastic films are completely water resistant, thermoplastic and impermeable to vapors. The distinct properties of the coated plastic films make it possible to use them in a wide variety of applications. In addition, a variety of features can be obtained by modifying the coated layer of the film. For example, colored coating composition is used to make a colored film, and also a water-repellent agent is used in the coating composition and so on. It is also understood that the conventional techniques can be applied, i.e., lubricant, colorant, antistatic agent and the like are incorporated in the coating composition.

The superior surface strength of the coated film of this invention is proved by use on actual printing machines, but it is conveniently tested by a simple test using an adhesive tape. In this test, the adhesive tape is affixed to the surface of the film, then it is peeled at varying rates from the surface and the appearance of the surface is observed. When it peels at slow tearing speed, the surface strength will be insufficient for the printing. When it withstands this test, it may usually be safe to the printing. Further, when it withstands even an abrupt tearing, the surface strength is satisfactory for printing and drawing.

The invention is further illustrated by following Examples, but it should be noted that this invention is not restricted to or by the Examples.

A Control Example

A coating composition was prepared by dissolving 600 parts of polystyrene in 3,000 parts of dimethylformamide, to which was added 1,500 parts of calcium carbonate. A biaxially oriented polystyrene film having the $75\mu$ thickness was coated on one side with the coating composition by means of a roll coater, followed by treatment with water for 30 seconds and dried at 60°C for 1 minute. The other side of the film was coated in the same way to make a white, opaque lustrous coated film having the $115\mu$ thickness. This film was subjected to an offset printing test, but the surface of the coated film was seriously peeled off by the tackiness of the printing ink. Thus, the coated film had no practical value for the printing use.

On the coated surface of this film, an adhesive tape was affixed and peeled off slowly, resulting in a complete peeling of the surface layer. The coated film was heated for 10 minutes at 90°C in an air oven, but the surface strength was scarecely increased, and the offset printing test and the adhesive tape test were conducted as equal to that of the original coated film. Also the coated film was immersed in hot water at 90°C for 30 seconds, and again the surface strength was not improved at all.

EXAMPLE 1

A coating composition was prepared by dissolving 600 parts of polystyrene in 3,000 parts of dimethylformamide, to which was added 100 parts of dioctylphthalate and 1,500 parts of calcium carbonate. A biaxially oriented polystyrene having the $75\mu$ thickness was coated on one side with the composition by means of a roll coater, followed by treatment with water for 20 seconds and then passed through hot water for 5 seconds at temperature of 90°C, and dried at 80°C for 30 seconds. The other side of the film was coated and treated in the same manner to give a white, opaque coated film having the $105\mu$ thickness. This film was subjected to an offset printing test. The printed images were clear, and there was neither picking nor peeling on the printed surface. On the surface of the coated film, an adhesive tape was affixed and peeled abruptly, but the surface was not affected by this test. This film was suitable for the use in printing as well as drawing.

EXAMPLE 2

A coating composition was prepared by dissolving 100 parts of styrene-butadiene copolymer in 2,000 parts of dimethylformamide, to which were added 50 parts of tricresyl phosphate and 100 parts of magnesium carbonate. This composition was coated on one side of the styrene-acrylonitrile copolymer film having the $50\mu$ thickness by means of roll coater, followed by the treatment with hot water at 80°C for 5 seconds and dried at 70°C for 20 seconds. The other side of the film was coated and treated in the same manner to give a white, translucent film having the $70\mu$ thickness. This film was excellent for drawing and clearly printed by the offset and the gravure printing.

EXAMPLE 3

A coating composition was prepared by dissolving 600 parts of styrene-acrylonitrile copolymer in 2,000 parts of dimethylformamide, to which was added 10 parts of trioctyl phosphate, 600 parts of kaolinite clay. A biaxially oriented high impact polystyrene (styrene-butadiene copolymer) film having the 120μ thickness was coated on one side with this composition by means of a roll coater, and immediately introduced into water for 10 seconds and then into hot water at 95°C for 10 seconds followed by drying at 85°C for 20 seconds. The other side of the film was coated and treated in the same manner for obtaining a white, opaque coated film having the 160μ thickness. Printing and drawing qualities of this film were equivalent to that of the film produced by the preceding examples.

EXAMPLE 4

A coating composition was prepared by dissolving 300 parts of styrene-acrylonitrile copolymer in 2,000 parts of dimethyl formamide, to which was added 50 parts of trioctylphosphate, 600 parts of calcium carbonate and 30 parts of titanium dioxide. This composition was coated on one side of styrene-butadiene copolymer film having the 100μ thickness by means of an air knife coater and followed by the treatment with water for 30 seconds and dried at 60°C for 20 seconds. The other side of the film was coated and treated in the same manner for obtaining a white, opaque and lustrous film having the 150μ thickness. This film passed barely the gravure printing test, but the picking was observed on the surface by the offset printing test. The coated film was further treated with steam for 10 seconds at 100°C for obtaining a white and opaque film having the 130μ thickness. Printing and drawing qualities of this film were equivalent to those of the films obtained in the preceding Examples.

EXAMPLE 5

500 parts of polystyrene were dissolved in 600 parts of dimethylformamide, to which was added 100 parts of dioctylphthalate, and 1,500 parts of calcium carbonate (which contain 0.8% of moisture) to give a coating composition having a viscosity of about 35,000 cps. This composition was coated on a high-impact polystyrene film having the 50μ thickness by means of a reverse roll coater, and followed by treatment with water for 30 seconds and with hot water at 85°C for 5 seconds. After drying at 80°C for 20 seconds, a white, opaque film having the 95μ thickness coated on one side was obtained. Printing and drawing qualities of this film were equivalent to those product in the preceding Examples.

EXAMPLE 6

500 parts of polystyrene having the mean molecular weight of about 75,000 was dissolved in 100 parts of dimethylformamide, to which was added 100 parts of dibutyl phthalate, 100 parts of kaolinite clay (which containes 0.2% of moisture), and 100 parts of titanium dioxide (which contain 0.1% of moisture) to give a coating composition. This composition was coated on one side of a styrene-acrylonitrile copolymer film having the 100μ thickness by means of a gravure roll coater, and followed by treatment with hot water at 90°C for 10 seconds then passed through water for 30 seconds and dried at 90°C for 20 seconds. The other side of the film was coated and treated in the same manner for obtaining a white and translucent film having the 150μ thickness. Printing and drawing qualities of this film were equivalent to those of the films produced by the preceding Examples.

EXAMPLE 7

A coating composition was prepared by dissolving 200 parts of polyvinyl chloride in 2,000 parts of dimethylformamide, to which was added 150 parts of dioctyl azelate, 200 parts of calcium carbonate, 200 parts of kaolinite clay, and 10 parts of titanium dioxide. This composition was coated on one side of a polyvinyl chloride film having the 50μ thickness, followed by treating with water for 30 seconds and then the film was passed through under blowing steam within 3 seconds and finally dried at 80°C for 20 seconds. The other side of the film was coated and treated in the same manner for obtaining a white, opaque coated film having the 90μ thickness. Printing and drawing qualities of this film were equivalent to those of the films produced by the preceding Examples.

EXAMPLE 8

A coating composition was prepared by dissolving 100 parts of poly (vinyl chloride) in 1,500 parts of dimethylformamide, to which was added 50 parts of dilaurylphthalate and 50 parts of calcium carbonate. This composition was coated on one side of a vinyl chloride-vinylidene chloride copolymer film having the 50μ thickness by means of air knife coater, followed by treatments with water for 30 seconds and with hot water at 70°C for 5 seconds, and finally dried at 70°C for 30 seconds. The other side of the film was coated and treated in the same manner to make a white and translucent coated film having the 70μ thickness. Printing and drawing qualities of this film were excellent as in those of the films obtained in the preceding Examples.

EXAMPLE 9

A coating composition was prepared by dissolving 500 parts of cellulose acetate in 1,500 parts of dimethylformamide, to which was added 200 parts of tricresyl phosphate, 10 parts of antistatic agent di-lauryl phosphate (Electol No. 200, Nippon Oil Chemical Co.), 1,500 parts of calcium carbonate and 100 parts calcium hydroxide. A cellulose acetate film having the 80μ thickness was coated on one side with this composition by means of roll coater, and followed by treatment with water for 20 seconds and then with hot water at 90°C for 10 seconds and finally dried at 80°C for 30 seconds. The other side of the film was coated and treated in the same manner for obtaining a white, opaque coated film. Printing and drawing qualities of this film were excellent, and it was found that the tendency of electrostatic charging was very low.

EXAMPLE 10

A coating composition was prepared by dissolving 300 parts of poly (vinyl chloride), 100 parts of vinyl chloride-vinylidene chloride copolymer and 30 parts of poly (vinyl acetate) in 1,000 parts of dimethylformamide, to which was added 30 parts of butyl lauryl phthalate, 20 parts of trioctyl phosphate, 20 parts of dibenzyladipate, 500 parts of kaolinite clay, 50 parts of magnesium carbonate and 30 parts of stearic acid. This composition was coated on one side of a biaxially oriented poly (vinyl chloride) having 75μ thickness by means of roll coater, followed by treatment with water for 30 seconds then passed through a hot water at 70°C for 7 seconds. This film was still slightly wet on the coated surface and could be directly used for preparing a self adhesive film by coating an adhesive on the other side of the film. Printing and drawing qualities of this film were excellent and equal to those of the films obtained in the preceding Examples.

EXAMPLE 11

A red colored coating composition was prepared by dissolving 500 parts of polystyrene in 1,000 parts of dimethylformamide, to which was added 100 parts of butyl lauryl phthalate, 800 parts of calcium carbonate, 200 parts of titanium dioxide and 30 parts of red colored dye aminoazobenzene-azonaphthol (Solvent Red 24). A biaxially oriented high impact polystyrene film having the 75μ thickness was coated on one side with this colored composition by means of roll coater, and followed by treatment with water for 30 seconds and then with hot water at 85°C for 5 seconds and finally dried at 85°C for 20 seconds. The other side of the film was coated and treated in the same manner for obtaining a red colored coated film having the 130μ thickness. It was found that the printing and drawing qualities and the surface strength are equal to those of the films obtained in the preceding Examples.

What we claim is:

1. A process for producing a coated plastic film for synthetic paper, having a microporous surface layer for use in the graphic art which comprises the steps of:
    A. coating at least one surface of a polymeric plastic film substrate, the surface of which is soluble or swellable in dimethylformamide, with a coating composition comprising (1) a resin prepared by using at least one of the main monomers from which the polymeric plastic film substrate is made; (2) a plasticizer for said resin; (3) an inorganic powder, and (4) dimethylformamide as the solvent to form a swollen coating layer on the said plastic film;
    B. partially dissolving and swelling the plastic film substrate by the action of the dimethylformamide component of the coating composition thereon;
    C. subsequently converting said swollen surface layer into a microporous surface layer by contacting said coated substrate with hot water in the order of 70° – 100°C whereby the dimethylformamide is leached from the swollen coating and substrate to provide a microporous surface coating on said substrate;
    D. heat treating said microporous coated layer to strengthen same;
    E. drying said coated plastic film.

2. A process according to claim 1 wherein the heat treatment is conducted by a heating means selected from the group consisting of, steam, infrared radiant sources, hot air sources, heated rolls, or induction heating sources.

3. The process according to claim 1, wherein said coating composition includes a colorant, a lubricant, an antistatic agent, or a mixture thereof.

4. A process according to claim 1, wherein said plastic film is a film made of a vinyl polymer, vinyl copolymer, polycarbonate, 8-nylon or cellulosic plastics.

5. A process according to claim 1 wherein said resin contained in the coating composition is a vinyl polymer, vinyl copolymer, polycarbonate, 8-nylon, cellulosic plastics or a mixture of these polymers.

6. A process according to claim 1 wherein said plasticizer is a compound soluble in dimethylformamide, insoluble in water and compatible with the resin contained in the coating composition.

7. A process according to claim 1 wherein said plastic film comprises polystyrene.

8. A process according to claim 1 wherein said plastic film comprises polyvinyl chloride.

9. A process according to claim 1, wherein said coating composition comprises 100 parts of the resin, 1 to 100 parts of the plasticizer, 20 to 1,000 parts of the inorganic fine powder, and 20 to 2,000 parts of dimethylformamide.

10. A process according to claim 1, wherein said coating composition comprises 100 parts of the resin, 1 to 100 parts of the plasticizer, 10 to 500 parts of the inorganic fine powder, and 20 to 200 parts of dimethylformamide, and the moisture content of the said inorganic fine powder is restricted to less than 10 parts.

11. A process according to claim 1, wherein said coating composition comprises 100 parts of the resin, 1 to 100 parts of the plasticizer, 10 to 1,000 parts of the inorganic fine powder, and 200 to 1,000 parts of the cimethylformamide.

12. A process according to claim 1, wherein said coating composition comprises 100 parts of the resin, 5 to 50 parts of the plasticizer, 30 to 500 parts of the inorganic fine powder, and 100 to 1,000 parts of dimethylformamide.

13. A process according to claim 1, wherein the heat treatment is conducted at any stage after the water treatment.

14. A process according to claim 1, wherein said heat treatment is conducted immediately after the coating step.

* * * * *